G. N. BEARD.
Bale-Ties.
No. 156,753. Patented Nov. 10, 1874.
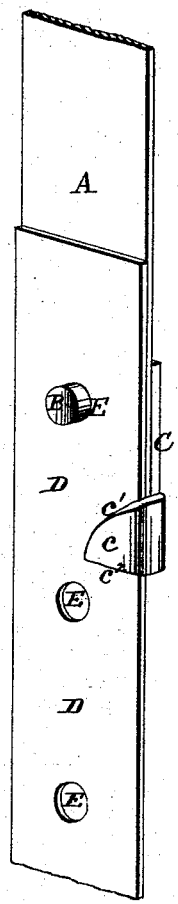
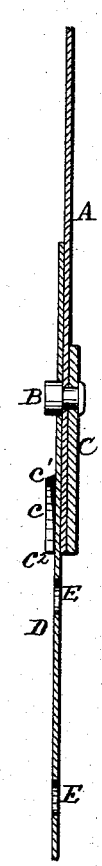
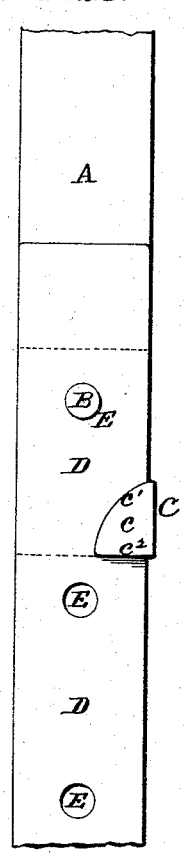
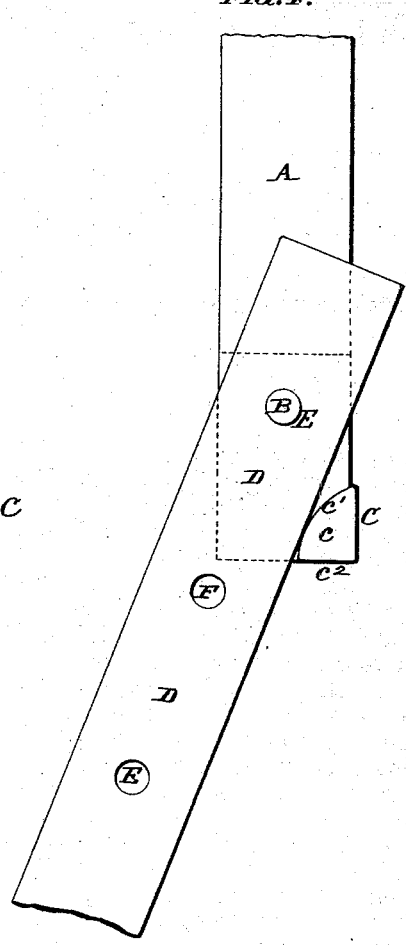
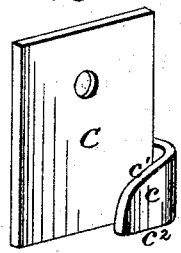
ATTEST:
Robert Burns
Henry Tanner.
INVENTOR:
George N. Beard
B. Knight Bro.
Attys.

UNITED STATES PATENT OFFICE.

GEORGE N. BEARD, OF ST. LOUIS, MISSOURI.

IMPROVEMENT IN BALE-TIES.

Specification forming part of Letters Patent No. 156,753, dated November 10, 1874; application filed September 22, 1874.

CASE B.

*To all whom it may concern:*

Be it known that I, GEORGE N. BEARD, of St. Louis, St. Louis county, Missouri, have invented a certain Improved Bale-Tie, of which the following is a specification:

This improvement consists in a plain round stud projecting inward from one end of the band, and which engages in any one of a series of round holes in the other end of the band. On the stud end of the band is a hook, which takes under the perforated end, to hold the ends together and prevent the stud from drawing out of the hole, and at the same time permits the ends to be coupled in parallel position.

In the drawings, Figure 1 is a perspective view of the tie in a locked condition. Fig. 2 is a longitudinal section in same condition. Fig. 3 is an inside view in same condition. Fig. 4 is an inside view in process of engagement. Fig. 5 is a perspective view of the hook-plate.

A is the stud end of the band or hoop, and B is a round stud projecting from its inner side. C is the hook-plate, having a hook, $c$, attached to and lapping around one edge of the end A, and passing under the perforated end D, to hold the ends in close contact, and prevent the stud B drawing out of the eye E. The inner edge $c^1$ of the hook $c$ is preferably spread out somewhat more open or wider than the edge $c^2$, to allow the end D to be coupled in parallel position, and when loose to bow inward, to release the stud in tightening the band when the ends are in line together.

This laxity will not lessen the efficiency of the tie, because, when the strain is upon the band, the edge $c^2$ will be in close contact with the under lap or end D, and hold the end A in position close upon it.

The tensional strain in this tie comes altogether on the rounded surface of the stud and eye, and consequently there is no corner to form an incipient crack and constitute an element of weakness.

I claim—

The combination of the hook-plate C, having a hook, $c$, flaring backwardly, and round stud B on the end A, and round eyes E on the end D of the band, all constructed and operating substantially as set forth.

GEORGE N. BEARD.

Witnesses:
SAML. KNIGHT,
ROBERT BURNS.